United States Patent
Bilger et al.

(10) Patent No.: US 9,834,157 B2
(45) Date of Patent: Dec. 5, 2017

(54) METHOD FOR REDUCING REFLECTANCE OF BRIGHT DECORATIVE TRIM UNDER HIGH AMBIENT LIGHT CONDITIONS

(71) Applicant: Ford Global Technologies, LLC, Dearborn, MI (US)

(72) Inventors: Donald Paul Bilger, Livonia, MI (US); Megan May Lovejoy, Dearborn, MI (US); Mahendra Somasara Dassanayake, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/254,457

(22) Filed: Apr. 16, 2014

(65) Prior Publication Data
US 2015/0298622 A1    Oct. 22, 2015

(51) Int. Cl.
*G02F 1/03* (2006.01)
*B60R 13/02* (2006.01)

(52) U.S. Cl.
CPC ...... *B60R 13/02* (2013.01); *B60R 2013/0287* (2013.01)

(58) Field of Classification Search
CPC ........................................ G02B 5/23
USPC ........................................ 359/241
See application file for complete search history.

(56) References Cited

U.S. PATENT DOCUMENTS

| | | |
|---|---|---|
| 4,609,266 A | 9/1986 | Blom |
| 5,122,905 A | 6/1992 | Wheatley et al. |
| 5,194,990 A | 3/1993 | Boulos et al. |
| 5,316,359 A | 5/1994 | Lansinger |
| 5,363,470 A | 11/1994 | Wortman |
| 5,903,695 A | 5/1999 | Zarian et al. |
| 6,501,457 B1 | 12/2002 | Bruechmann et al. |
| 6,746,126 B2 | 6/2004 | Scherber et al. |
| 7,170,574 B2 | 1/2007 | Tan et al. |
| 7,972,701 B2 | 7/2011 | Martz et al. |
| 8,449,161 B2 | 5/2013 | Igoe et al. |
| 8,467,129 B2 | 6/2013 | Munro |
| 2007/0217010 A1 | 9/2007 | Lippey |

(Continued)

FOREIGN PATENT DOCUMENTS

| | | |
|---|---|---|
| DE | 19630812 A1 | 2/1998 |
| EP | 0448260 A2 | 9/1991 |
| JP | 2001276725 A | 10/2001 |

*Primary Examiner* — James Jones
(74) *Attorney, Agent, or Firm* — Vichit Chea; Price Heneveld LLP

(57) ABSTRACT

In a dimmable trim component for a vehicle interior, a trim article includes a reflective member having a photoreactive or an electro-optic coating disposed over the reflective member. The reflective member is configured to reflect ambient light. The coating is a bistable coating and is operable between a first light transmissive state and a second light transmissive state. When in the first light transmissive state, ambient light is transmitted to the reflective member for reflection by the reflective member through the coating. When in the second light transmissive state, a portion of the ambient light is absorbed by the coating and therefore, not reflected by the reflective member, such that the coating provides a dimming effect to the trim article in high ambient conditions.

8 Claims, 2 Drawing Sheets

(56) References Cited

U.S. PATENT DOCUMENTS

| | | | |
|---|---|---|---|
| 2009/0009874 A1* | 1/2009 | Englander | B60R 1/083 359/604 |
| 2009/0268273 A1 | 10/2009 | Powers et al. | |
| 2015/0036204 A1* | 2/2015 | Branda | G02B 5/23 359/244 |

* cited by examiner

METHOD FOR REDUCING REFLECTANCE OF BRIGHT DECORATIVE TRIM UNDER HIGH AMBIENT LIGHT CONDITIONS

FIELD OF THE INVENTION

The present invention generally relates to a dimmable trim component for a vehicle interior, and more specifically, to a dimmable trim component having a dimmable coating that is either photoreactive or electro-optic, wherein the dimmable coating controls or otherwise alters the amount of light reflected from a reflective member of the trim component.

BACKGROUND OF THE INVENTION

Real chrome plating or simulated chrome plating is commonly used in various finishing trim components in automotive interiors as a decorative design accent. Under bright ambient lighting conditions (e.g., sunlight), light reflected from such decorative accents can contribute to driver distraction or even driver fatigue. This problem can be mitigated to some extent by incorporating a matte finish over highly reflective trim article or by making the trim surface curved to reflect a lower percentage of ambient light. Other approaches to reduce trim reflection have included limiting the overall amount or location of bright or highly reflective interior trim accents. The aforementioned approaches, however, are often not compatible with a desired design theme that a design studio has chosen for a particular vehicle interior. Thus, a design studio for a vehicle interior is limited creatively when trying to incorporate reflective trim accents into a visually pleasing vehicle interior aesthetic.

Thus, a means of controlling or dimming the reflection from reflective trim accents would address the driver distraction and fatigue issues without limiting the creative latitude available to a vehicle design studio. The present invention provides a means of attenuating or dimming the reflection of ambient light from reflective trim accents under high ambient light conditions.

SUMMARY OF THE INVENTION

One aspect of the present invention includes a dimmable trim component for a vehicle interior wherein a trim article includes a reflective portion having a photoreactive coating substantially covering the reflective portion. The photoreactive coating includes a photochromic dye, thereby defining a dimmable coating capable of transmitting a percentage of visible light to the reflective portion in a ground state and reducing the percentage of visible light transmitted to the reflective portion when the photoreactive coating is in an activated stated.

Another aspect of the present invention includes a dimmable trim component for a vehicle interior, wherein a trim panel includes an accent trim portion with a reflective layer. The reflective layer is configured to reflect an amount of ambient light. A photochromic layer is disposed over the reflective layer and is operable between a ground state and an excited state. The photochromic layer reduces the amount of ambient light reflected from the reflective layer when the photochromic layer is in the excited stated.

Yet another aspect of the present invention includes a dimmable trim component for a vehicle interior comprising a trim article having a reflective member and an electro-optic coating disposed over the reflective member. The reflective member is configured to reflect ambient light. The electro-optic coating includes electro-optic particles which are bistable and operable between a first light transmissive state and a second light transmissive state. When the electro-optic particles are in the first light transmissive state, ambient light is transmitted to the reflective member for reflection by the reflective member. When the electro-optic particles are in the second light transmissive state, a portion of ambient light is absorbed by the electro-optic coating and therefore, not reflected by the reflective member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
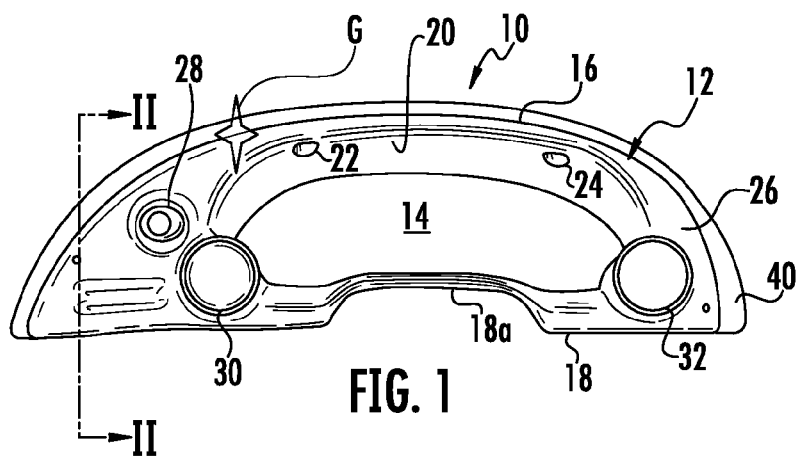
FIG. 1 is a side elevational view of a vehicle trim component having an accent trim portion.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of this disclosure, an interior trim article for a vehicle refers to any interior piece of vehicle equipment, or part thereof, suitable for receiving a photoreactive or electro-optic coating described herein. Interior trim articles may include instrument panels, door panels, bezels, registers, instrument clusters, arm rests, consoles, glove compartment doors, and trim lines, which may extend across an instrument panel, dashboard, door, or any other part within a vehicle interior. Further, for the purposes of this disclosure, a trim article may include an accent trim portion that includes a reflective layer or reflective member which provides the appearance of a reflective surface, such as a metallic reflective surface in the nature of chrome, simulated chrome, nickel plating, and brushed nickel surfaces, for example.

Referring now to FIG. 1, the reference numeral 10 generally designates a trim article in the form of an instrument cluster. The instrument cluster 10 includes a generally conventional design for positioning within a vehicle interior in front of a steering wheel. As shown in FIG. 1, the instrument cluster 10 includes a main housing portion 12 with a generally centrally located window 14 through which any number of automotive gauge assemblies or display screens can be disposed for relaying information to the driver of the vehicle. The main housing 12 includes an arcuately shaped upper portion 16 and a generally planar lower portion 18 having a relief portion 18a which is generally adapted to receive a steering column in assembly. The centrally extending window 14 is generally a recessed feature having a shelf-like member 20 disposed thereabove. The instrument cluster 10 further includes attachment locations 22, 24 which can be used to couple portions of the instrument cluster 10 together. Further, the instrument cluster 10 includes a generally front facing portion 26 having a number of display members 28, 30, 32 which are generally molded-in features on a polymeric instrument cluster 10 which can house any number of automotive interior features, such as ignition columns, vents, gauges, display screens, interior light fixtures, and other such features found in a vehicle interior. Finally, in the embodiment of FIG. 1, the instrument cluster 10 includes an accent trim portion 40 which is disposed about the upper portion 16 of the main housing 12. The accent trim portion 40 may include a metallic plating, an actual metallic trim component, or a simulated metallic trim component that is considered to be a decorative accent that is highly reflective as indicated by glare mark G in FIG. 1. The accent trim portion 40 is a decorative piece which is substantially disposed on the upper portion 16 of the main housing 12 to provide a decorative accent to the trim article 10. As used throughout the disclosure, terms such as "reflective member", "reflective layer", "reflective portion", "accent trim", "bright trim" and other such identifiers are used to indicate portions of a trim component which generally reflect an amount of ambient light, such as sunlight, and are therefore suitable for a coating or structural configuration that would provide for a dimming effect to the trim component as further described below. Further, the term "ambient light" as used herein refers to light conditions within the interior of a vehicle. In certain cases, the UV light within a vehicle interior may be filtered out by tinted glass, such that the ambient light within the vehicle interior can include both visible and invisible lighting conditions as determined by the presence or omission of any light filters in place in the vehicle.

Figure 2A:
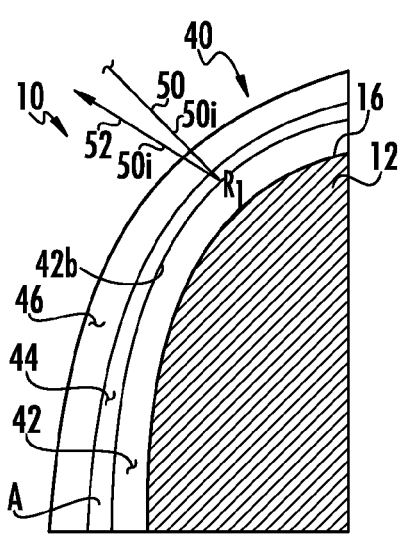
FIG. 2A is a fragmentary cross-sectional view of the vehicle trim component of FIG. 1 taken at line II having a photoreactive layer disposed over the accent trim portion.
Figure 2B:
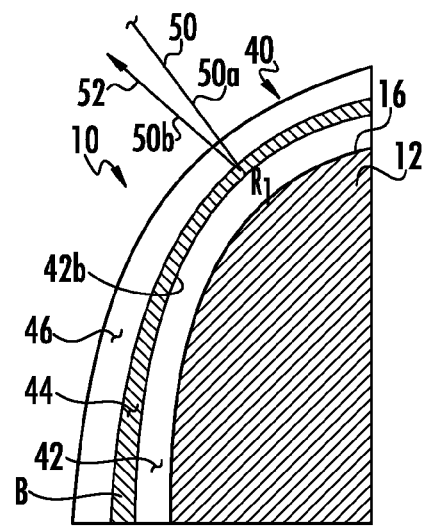
FIG. 2B is a fragmentary cross-sectional view of the trim component of FIG. 2A with the photoreactive layer in an activated state.

Referring now to FIGS. 2A and 2B, a cross-section of a portion of the instrument cluster 10 is shown having an accent trim portion 40 disposed on the upper portion 16 of the main housing 12. In the embodiment shown in FIGS. 2A and 2B, the accent trim portion 40 includes a reflective layer 42, a photoreactive layer 44 and a protective layer 46. As used throughout this disclosure, the reflective layer 42 may be a reflective portion of a trim article, a reflective member coupled to a trim article or a reflective coating or plating applied to a trim article. As such, the reflective layer 42 may be a coating that is applied to the upper portion 16 of the main housing 12 by painting, screen printing, spraying, slot coating, dip coating, roller coating or bar coating the reflective layer 42 thereon. Alternatively, the reflective layer 42, as well as the photoreactive layer 44 and protective layer 46, may be coextruded to prepare an integrated and multi-layered accent trim portion 40 for the instrument cluster 10. The reflective layer 42 may also be referred to as a chromatic layer comprised of various metal particles, materials, coatings or paint that can produce a desired reflective surface having a chrome or mirror like appearance. Thus, the reflective layer 42 may take the form of a film, coating, multi-layer structure or other suitable structure for providing the desired reflective appearance. Various materials that can be used for inclusion in the reflective layer 42 to provide a reflecting effect include automotive grade metallic paint, automotive grade silver paint, substrates containing particles or flakes of indium, silver, chromium, or aluminum. The reflective layer 42 may be deposited, formed or applied to the upper portion 16 of the main housing 12, and may also be applied thereto using an evaporation deposition method. A vacuum metallization method may also be used to apply the reflective layer 42 to the upper portion 16 of the main housing 12. Reflective paints, hot foils, physical vapor deposition coatings and chrome coatings may also serve as suitable materials used for the reflective layer 42. As noted above, the reflective layer 42 is applied to the upper portion 16 of the main housing 12 of the instrument cluster 10 and, as further noted above, the reflective layer 42 may be applied to any trim article disposed within a vehicle interior.

The main housing 12 may be comprised of injection molded polymeric parts which are structurally suitable materials for use as a backing member. Such polymeric materials may include ABS plastics, polycarbonate, or combinations thereof. Such polymeric materials provide structurally sound trim articles that offer high durability under long term ambient exposure. Further, the main housing 12 could be made of a metallic material, such as aluminum or steel. If the material used for the main housing 12 is conductive, it is contemplated that a non-conductive insulating layer can be disposed over the same, such that he main housing 12 would not interfere with any electrical components of the system, which are further described below.

As further shown in FIGS. 2A and 2B, the photoreactive layer 44 is disposed over the reflective layer 42, such that the photoreactive layer 44 substantially covers the reflective layer 42 in assembly. The photoreactive layer 44 defines a coating over the reflective layer 42 that is operable between a ground state A, shown in FIG. 2A, and an activated or excited state B, shown in FIG. 2B. The photoreactive layer 44 includes photochromic compounds, such as photochromic or photoreactive dyes, which are bistable compounds that react to certain lighting conditions, such as sunlight. The term bistable, as used throughout this disclosure, refers to compounds, layers, and coatings that have first and second display states which differ in at least one optical property, such as light transmission, light absorption or birefringence. With reference to FIGS. 2A and 2B, the photoreactive layer 44 is bistable in that the ground state A defines a generally transparent or light transmissive coating, while the activated state B defines a translucent or light absorbing coating. As such, when in the activated state B, the photoreactive layer 44 blocks or absorbs some or all wavelengths of light to which it is exposed. In this way, when in the activated state B, the photoreactive layer 44 blocks, or partially blocks, light from the reflective layer 42 over which it is disposed. In this way, the photoreactive coating 44 defines a dimmable trim coating for the accent trim 40 of the instrument cluster 10. By blocking or absorbing some or all of the ambient light received by the reflective layer 42, the photoreactive layer 44 controls the amount of light reflected from the reflective layer 42 as further described below.

In the simplest of terms, the photoreactive layer 44 is adapted to change color when exposed to ambient light at wavelengths generally in a range of about 400 nm to about 700 nm, when the light is first filtered by tinted glass, and about 250 nm to about 400 nm, which includes light that is invisible to the human eye, when the ambient light is unfiltered. The color change is due to the different levels of absorption of light between the ground state A and activated state B. As shown, and further described below, the ground state A is substantially transparent allowing ambient light to be reflected from the reflective layer 42. The activated state B is translucent, and thereby blocks a substantial portion of the ambient light from reaching the reflective layer 42 by absorbing the ambient light. The bistability of the photoreactive layer 44 is "reversible", in that when the photoreactive layer 44 changes to the activated state B, the photoreactive layer 44 will revert to the ground state A as the high ambient light conditions dissipate. The photochromic effects of the photoreactive layer 44 are provided by photochromic compounds as further described below.

Suitable photochromic compounds for use in providing a dimmable effect to a bright trim article include benzopyrans, stilbenes, nitrones, naphthopyrans, spirobenzopyrans, spironaphthopyrans, spirobenzoxzines, spironaphthoxazines, fulgides, quinones and fulgimides. These compounds may be incorporated into a photochromic dye that provides for an ink which is generally colorless, but changes to a predetermined color in the presence of a certain level of ambient light for which the dye is chosen. The photochromic compounds are able to change color, in a way that is detectable by the human eye, by changing configuration, alignment within a substrate or by physically altering their structure when subjected to ambient light in a vehicle interior. As the source of ambient light is removed, the photochromic compounds will revert to their more stable and often colorless ground state A by a process known as reversion. Photochromic compounds can degrade in their ability to reversibly change form and change light absorption qualities by exposure to free radicals over time. Thus, the photoreactive layer 44 of the present invention may include a matrix into which the photochromic compounds are disposed, or may include a protective polymeric layer, such as protective layer 46 shown in FIGS. 2A and 2B. The photoreactive layer 44 may also be applied as a thin film coating over the reflective surface or layer 42 that does not require a protective layer.

To enhance the fatigue resistance of the photochromic compounds, stabilizers such as antioxidants, light stabilizers, and UV absorbers are added in the photoreactive layer 44. Suitable resin materials for use in creating a matrix for hosting the photochromic compounds include polycarbonate, polysulfone, cellulose acetate butyrate (CAB), polyacrylates, polyesters, polystyrene, copolymer of an acrylate and styrene, blends of compatible transparent polymers. Preferred resins are polycarbonate, CAB, polyacrylates, and copolymers of acrylate and styrene. A polycarbonate-based resin is particularly preferred because of high transparency, high tenacity, high thermal resistance and high refractive index. As disposed within a polymeric matrix, the photochromic compounds are still functional bistable compounds capable of changing absorption spectra between the ground and activated states A, B.

The quantity of photochromic compounds incorporated into the polymeric matrix of the photoreactive layer 44 of the present invention is determined by the desired light blockage in the activated state B and the thickness of the polyurethane layer itself. The amount of photochromic compounds needed is inversely proportional to the thickness of the polyurethane layer. In other words, to achieve the same outdoor light transmission the thicker the polyurethane layer, the lower the concentration of photochromic compound(s) needed. The concentration of the photochromic compounds also depends on the desired color intensity of the photochromic compounds in the activated state B.

In a preferred embodiment of the invention, a photochromic coating or photochromic layer 44 darkens from a clear or nearly clear ground state A to a neutral gray color in the activated state B as a reaction to high levels of ambient light. A clear protective hard coating may be incorporated in the photochromic layer 44 or may be applied over the photochromic layer 44, such as protective layer 46, to meet requirements for resistance to abrasion and chemical exposure of the trim article. In the exemplary embodiment described above, the accent trim 40 will have a metallic look under low level ambient conditions, as the photochromic layer 44 will be in the substantially transparent state, such that the reflective layer 42 is revealed and ambient light is reflected therefrom. As the ambient conditions change to high levels of ambient light, the photochromic layer 44 will change to the substantially translucent state, such that a natural gray photochromic dye in the photochromic layer 44 will absorb the ambient light and conceal the reflective layer 42, thereby giving the accent trim 40 a change of color to a neutral gray appearance. Such a fluctuation between metallic and gray coloration provides for an accent trim 40 that is substantially inert in appearance in both low level and high level ambient light conditions by including a dye with a gray coloration configured to imitate the natural appearance of the reflective layer 42. The photochromic die may also include a pigmentation that is noticeably contrasting with the appearance of the reflective layer 42, for providing a dramatic change in the appearance of the accent trim 40 in varying ambient conditions as the photochromic layer 44 converts from the ground state A to the activated or excited state B.

As further shown in FIGS. 2A and 2B, incoming ambient light is generally indicated with reference numeral 50. As specifically shown in FIG. 2A, the incoming ambient light 50 propagates through the protective layer 46 as well as through the photoreactive layer 44 to a point of incidence $R_1$ disposed on the boundary surface 42b of the reflective layer 42. Point $R_1$ represents a point of incidence, wherein the incoming ambient light 50 is reflected from the boundary surface 42b of the reflective layer 42 back through the photoreactive layer 44 and protective layer 46 along a path as indicated by arrow 52. The optical path created by the incoming ambient light 50 and the reflected ambient light 52 is a simple optical path provided in this disclosure for descriptive purposes only. That is to say, refraction indices of the protective layer 46 and the photoreactive layer 44 have not been taken into account, nor any reflection at the boundaries or interface of these layers with respect to the incoming ambient light 50. With the photoreactive layer 44 in the ground state A, which is substantially transparent, the incoming ambient light 50 is able to propagate through the transparent protective layer 46 and photoreactive layer 44 at an intensity designated by $50_i$. Given the transparency of the photoreactive layer 44 and the protective layer 46, the incoming ambient light 50 is able to fully reflect off the boundary surface 42b of the reflective layer 42 in a path of reflected light as indicated by arrow 52 at an intensity which is substantially similar to the intensity $50_i$ of the incoming ambient light 50. Thus, as shown in FIG. 2A, the ambient light 50 is essentially fully reflected off of the reflective layer 42 of the accent trim 40 without inhibition by the photoreactive layer 44. As such, a similar and tolerable amount of ambient light reflected, as indicated by arrow 52, is demonstrated at an intensity of $50_i$ which presumably does not meet a threshold intensity necessary to activate the photoreactive compounds in the photoreactive layer 44.

Referring now to FIG. 2B, the incoming ambient light 50 is provided at an intensity of 50a and is shown in FIG. 2B as propagating through the substantially transparent protective layer 46. The intensity level 50a of the incoming ambient light 50 is enough to exceed a threshold intensity of ambient light, such that the photoreactive compounds within the photoreactive layer 44 are charged and brought to their activated state B, wherein substantially all of the wavelengths of light are absorbed in the photoreactive layer 44. As absorbed within the photoreactive layer 44, the incoming ambient light 50 will generally be blocked at the photoreactive layer 44 and therefore will not reach the point of incident $R_1$ disposed on the boundary surface 42b of the reflective layer 42. Incoming ambient light 50 which is not absorbed in the photoreactive layer 44 may propagate through the photoreactive layer 44 to the point of incidence $R_1$, as shown by dashed lines, and be reflected off the boundary surface 42b of the reflective layer 42 in a path as indicated by arrow 52. This reflective light 52 has an intensity indicated by reference numeral 50b which is lower than the intensity level 50a of the incoming ambient light 50. In this way, the reflective layer 42 is adapted to reflect an amount of ambient light through the photoreactive layer 44 when the photoreactive layer 44 is in a transparent ground state A, however, the amount of ambient light reflected 52 is substantially reduced, or altogether not present, when the photoreactive layer 44 is in the activated state B.

Figure 3A:
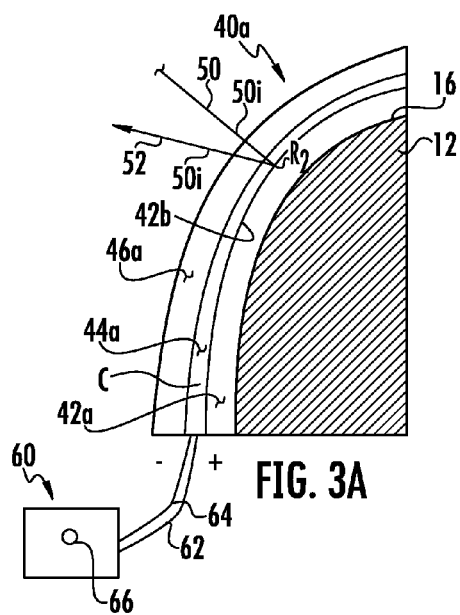
FIG. 3A is a fragmentary cross-sectional view of a trim component having an accent trim portion with an electro-optic layer in a first light transmissive stated coupled to an excitation source.
Figure 3B:
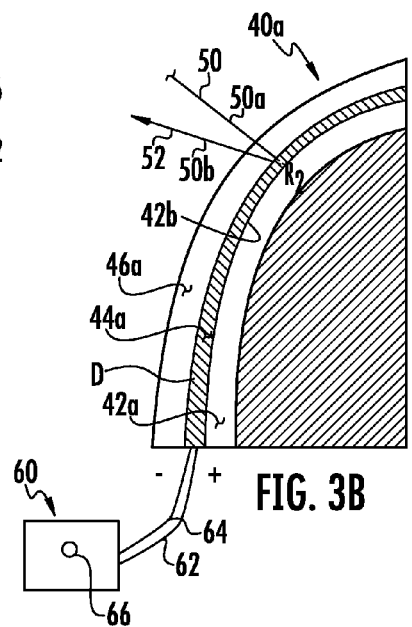
FIG. 3B is a fragmentary cross-sectional view of the trim component of FIG. 3A showing the electro-optic layer in a second light transmissive state.

Referring now to FIGS. 3A and 3B, another embodiment of the present invention is shown, wherein the upper portion 16 of the main housing 12 includes an accent trim portion 40a. The accent trim portion 40a includes a reflective layer 42a, an electro-optic layer 44a and a protective layer 46a. The protective layer 46a is similar to protective layer 46 described above with reference to FIGS. 2A and 2B. The reflective layer 42a may be comprised of a metallic material, or be plated with a metallic material or other like reflective coating similar to reflective layer 42 described above with reference to FIGS. 2A and 2B. The electro-optic layer 44a exhibits an electro-optical effect, such that the electro-optic layer 44a is configured to change one of the optical properties of the layer in response to the presence of an electric field. The optical property that is changed by the application of an electric field to the electro-optic layer 44a may be detectable by the human eye, and may include such properties as light transmission, reflectance, birefringence, optical transmission, light absorbance, or a color change. In this way, the electro-optic layer 44a is also bistable in a similar manner as noted above with photoreactive layer 44. It is contemplated that the electro-optic layer 44a may include thermochromic, suspended particle, electrochromic, or liquid crystal embodiments. It is contemplated that the electro-optic layer 44a can be tuned to precisely control the amount of light that reaches the reflective layer 42a for reflection therefrom. In order to change the light transmission properties of the electro-optic layer 44a, a voltage must be applied to the electro-optic layer 44a. As shown in FIGS. 3A and 3B, an electronic module 60 is adapted to supply a voltage to the electro-optic layer 44a using leads 62, 64. In this way, electronic module 60 is electrically coupled to the electro-optic layer 44a. The voltage provides an electric field to the electro-optic layer 44a which initiates a change in the way light is received at the electro-optic layer 44a. The electronic module 60 may be a variable resistor or potentiometer which serves as an excitation source for the electro-optic layer 44a and further includes a photocell 66 which is adapted to measure the intensity of the ambient light conditions. When the ambient light conditions meet a threshold intensity level, the electronic module 60 sends a voltage through leads 62, 64 to the electro-optic layer 44a such that an electric field is generated and the electro-optic layer 44a changes its optical properties from a first light transmissive state C (shown in FIG. 3A) to a second light transmissive state D (shown in FIG. 3B). Thus, the light transmissive states C, D represent first and second display states for the electro-optic layer 44a. As such, it is contemplated that ambient light is substantially transmitted through the electro-optic layer 44a, as indicated by arrow 50.

As further shown in FIGS. 3A and 3B, incoming ambient light is generally indicated by reference numeral 50. As specifically shown in FIG. 3A, the incoming ambient light 50 propagates through the protective layer 46a as well as through the electro-optic layer 44a to a point of incidence $R_2$ disposed on the boundary surface 42b of the reflective layer 42a. Point $R_2$ represents a point of incidence, wherein the incoming ambient light 50 is reflected from the boundary surface 42b of the reflective layer 42a back through the electro-optic layer 44a and protective layer 46a along a path of reflected light as indicated by arrow 52. The optical path created by the incoming ambient light 50 and the reflected ambient light 52 is a simple optical path provided in this disclosure for descriptive purposes only in a manner similar to that described above with reference to FIGS. 2A and 2B. With the electro-optic layer 44a in the first display state C, which is substantially transparent, the incoming ambient light 50 is able to propagate through the transparent protective layer 46a and electro-optic layer 44a at an intensity designated by $50_i$. Given the transparency of the electro-optic layer 44a and the protective layer 46a, the incoming ambient light 50 is able to fully reflect off the boundary surface 42b of the reflective layer 42a in a path of reflected light as indicated by arrow 52 at an intensity which is substantially similar to the intensity $50_i$ of the incoming ambient light 50. Thus, as shown in FIG. 3A, the ambient light is fully reflected off the reflective layer 42a of the accent trim 40 without inhibition by the electro-optic layer 44a. As such, a similar and tolerable amount of ambient light reflected, as indicated by arrow 52, is demonstrated at an intensity of $50_i$ which does not meet a threshold intensity necessary activate the electronic module 60 to send a voltage to the electro-optic layer 44a, thereby imparting a change of display states of the electro-optic layer 44a.

Referring now to FIG. 3B, the incoming ambient light 50 is provided at an intensity of 50a and is shown in FIG. 3B as propagating through the substantially transparent protective layer 46a. The intensity level 50a of the incoming ambient light 50 is enough to provide a threshold intensity of ambient light, such that the photocell 66 of the electronic module 60 detects the ambient light condition at an intensity of 50a, and thus signals the electronic module 60 to apply a voltage, and corresponding electronic field, to the electro-optic layer 44a to convert the electro-optic layer 44a from the first display state C to the second display state D, wherein substantially all of the wavelengths of light are absorbed in the electro-optic layer 44a. As absorbed within the electro-optic layer 44a, the incoming ambient light 50 will generally be blocked at the electro-optic layer 44a and thus, will not reach the point of incident $R_2$ disposed on the boundary surface 42b of the reflective layer 42a. Incoming ambient light 50 which is not absorbed in the electro-optic layer 44a may propagate through the electro-optic layer 44a to the point of incidence $R_2$, as shown by dashed lines, and be reflected off the boundary surface 42b of the reflective layer 42a in a path as indicated by arrow 52. This reflective light 52 has an intensity indicated by reference numeral 50b which is lower than the threshold exceeding intensity level 50a of the incoming ambient light 50. In this way, the reflective layer 42a is adapted to reflect an amount of ambient light 50 through the electro-optic layer 44a when the electro-optic layer 44a is in the first display state A, however, the amount of ambient light reflected 52 is substantially reduced, or altogether not present, when the electro-optic layer 44a is in the second display state B. As shown in FIGS. 3A and 3B, the photocell 66 is incorporated into the electronic module 60, however, it is contemplated that the photocell 66 may be disposed anywhere within a vehicle interior for appropriately gauging the intensity of the current ambient light conditions, yet still be electrically coupled to electronic module 60.

Figure 4A:
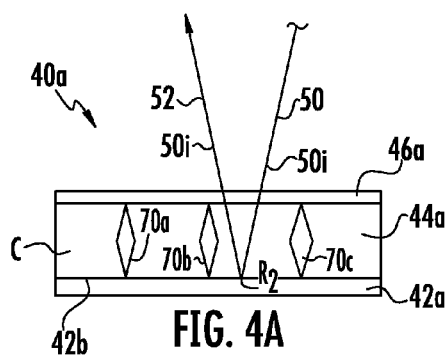
FIG. 4A is a fragmentary cross-sectional view of an electro-optic layer disposed over a reflective layer, wherein the electro-optic layer includes electro-optic particles having a first light transmissive condition.
Figure 4B:
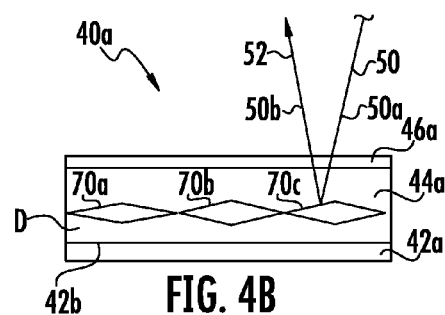
FIG. 4B is a cross-sectional view of the electro-optic and reflective layers of FIG. 4A, wherein the electro-optic particles are aligned to exhibit a second light transmissive condition.

Referring now to FIGS. 4A and 4B, an exemplary cross-section of the electro-optic layer 44a of accent trim 40a is shown having molecular particles 70a-70c suspended therein. In FIG. 4A, the electro-optic layer 44a is shown in the first display state C, wherein incoming light 50, at an intensity level of $50_i$, passes through the protective layer 46a and the substantially transparent electro-optic layer 44a for reflection at a point of incidence $R_2$ on a boundary surface 42b of the reflective layer 42a. In this way, the ambient light 50 is reflected at an intensity of $50_i$ as represented by arrow 52. With reference to FIG. 4B, the incoming ambient light 50 is at an intensity level 50a which, as noted above, exceeds a threshold intensity level such that the electronic module 60, shown in FIGS. 3A and 3B, has applied an electromagnetic field to the electro-optic layer 44a, which has caused the molecular particles 70a-70c to rapidly align in the formation shown in FIG. 4B which represents the second display state D of electro-optic layer 44a. In this configuration, the molecular particles 70a-70c block or absorb a majority of the incoming light 50a, such that the light reflected 52 is reflected at an intensity of 50b which is significantly less than the intensity 50a of incoming ambient light 50. Thus, as shown in FIG. 4B, little to no ambient light 50 is propagated through accent trim portion 40a to reach the reflective layer 42a for reflection therefrom. It is contemplated that the molecular particles 70a-70c may be any molecular particles known in the art that are adapted to align in a configuration as described above when an electric field is applied thereto, and which may also include a color change when converting from the first display state C to the second display state D. Further, it is contemplated that the molecular particles 70a-70c may naturally align in the second display state D, such that an electric field must be applied to the molecular particles 70a-70c for providing a light transmissive state C shown in FIG. 4A which allows reflection off the boundary surface 42b of the reflective surface 42a. Further, it is contemplated that the electronic module 60, shown in FIGS. 3A and 3B, need only provide a short voltage burst to the electro-optic layer 44a for converting the electro-optic layer 44a between first and second display states C, D. As such, the electronic module 60 does not need to supply a constant voltage to the electro-optic layer 44a in order for either of the display states to remain in place.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A dimmable trim component for a vehicle interior, comprising:
   an elongate accent trim piece having a reflective portion; and
   a photoreactive coating substantially covering the reflective portion, the photoreactive coating including a photochromic dye, wherein the photoreactive coating defines a dimmable coating that transmits ambient light from within the vehicle interior to the reflective portion in a ground state and reduces the amount of the ambient light from within the vehicle interior, transmitted to the reflective portion when in an activated state.

2. The dimmable trim component of claim 1, wherein the photoreactive coating is substantially transparent in the ground state.

3. The dimmable trim component of claim 2, wherein the photoreactive coating is substantially translucent in the activated state.

4. The dimmable trim component of claim 3, wherein the photoreactive coating is adapted to absorb ambient light in the activated state.

5. The dimmable trim component of claim 4, wherein the photochromic dye provides a change of color to the photoreactive coating as the photoreactive coating converts from the ground state to the activated state.

6. The dimmable trim component of claim 5, wherein the photochromic dye provides a change of color to the photoreactive coating when ambient light conditions exhibit wavelengths of about 400 nm to about 700 nm.

7. The dimmable trim component of claim 5, wherein the reflective portion comprises one of a metallic member, a metallic plated member, and a simulated metallic member.

8. The dimmable trim component of claim 7, wherein photochromic dye includes a gray coloration configured to imitate a color of the reflective portion.

\* \* \* \* \*